United States Patent Office 3,281,384
Patented Oct. 25, 1966

3,281,384
STABILIZATION OF SOLID POLYMER
DISPERSIONS
Richard E. Dietz, Bartlesville, Okla., assignor to Phillips Petroleum Company, a corporation of Delaware
No Drawing. Filed Oct. 28, 1960, Ser. No. 65,575
13 Claims. (Cl. 260—29.6)

This invention relates to the stabilization of dispersions of finely divided, solid polymers in inert liquids. In one aspect it relates to a method for preventing agglomeration of particles of solid polymer suspended in an inert liquid, particularly when the temperature is above the softening point of the polymer. In another aspect the invention relates to stable dispersions of solid polymers in inert liquids.

In certain processing operations for the physical or chemical treatment of solid olefin polymers, it is frequently desirable to disperse the polymer in pulverulent state in an inert liquid such as water and subject the system to temperatures at levels at or above the softening point of the polymer. When so operating, difficulties are frequently encountered because of agglomeration of the polymer. For example, a recently developed procedure for the chlorination of polyethylene as an aqueous dispersion involves conducting at least a portion of the chlorination procedure at a temperature in a range from about 220 to about 300° F. In such a process the particles of polyethylene and/or chlorinated polyethylene product tend to become sticky and to agglomerate in large masses. When such agglomeration occurs, further contacting of reactants with the polyethylene is reduced and the advantages of the process cannot be satisfactorily realized.

A procedure developed in the suspension polymerization art for prevention of agglomeration of polystyrene, polyacrylates, polyacrylonitrile, and the like involves incorporation in the system of finely divided inorganic solids such as silica, titanium dioxide, or the like. However, these materials have been found to be at best only partially effective for preventing agglomeration in dispersions of polymers of 1-olefins and/or their chlorinated derivatives in inert media such as water at elevated temperatures, some materials such as titania being completely ineffective, except in large amounts.

It is therefore a principal object to provide a method for preventing agglomeration of particles of solid polymer suspended in an inert liquid. It is also an object to provide a nonagglomerating dispersion of particles of solid polymer in an inert liquid. Another object is the provision of a dispersant for preventing agglomeration of particles of solid polymer dispersed in an inert liquid. Still another object is to provide a method for preventing agglomeration of polymer particles suspended in an inert liquid at a temperature above the softening temperature of the polymer. Other and further objects and advantages of the invention will be apparent to one skilled in the art upon studying the following disclosure of the invention.

I have now discovered that in operations involving the use of dispersions of finely divided polymers of 1-olefins and/or their chlorinated derivatives in inert media at elevated temperatures, agglomeration can be eliminated or substantially reduced by incorporation therein of a combination of a high molecular weight quaternary ammonium halide and a finely divided siliceous mineral, these substances apparently having a synergistic relationship in their stabilizing action.

The agglomerating temperature will vary depending upon the initial softening point of the polymer and the degree of chlorination of the polymer. Chlorinated polymer usually has a lower softening point than does the initial polymer. The dispersant system of the invention will prevent agglomeration of polymer particles at elevated temperatures at which agglomeration would otherwise occur.

The dispersant systems of the invention are effective in preventing agglomeration of polymers of olefins containing 2 to 6 carbon atoms including copolymers of such olefins with each other and with polystyrene and are particularly useful for polymers of ethylene or copolymers of ethylene with propylene and 1-butenes.

The quaternary ammonium compounds which are particularly useful in this invention are materials containing a pentavalent nitrogen atom, four valences of which are satisfied by carbon atoms and in which the quaternary ammonium radical has a formula weight of from 200 to 400. Such materials are derived from the reaction of a tertiary amine with an alkyl halide. Typical quaternary ammonium halides include decyltrimethylammonium chloride, dimethylethylnonylammonium chloride, cetyldimethylethylammonium chloride, cetylpyridinium chloride, octadecylquinolinium chloride, eicosylpyridinium chloride, trioctylmethylammonium chloride, methyldiheptyldodecylammonium chloride, tetrabutylammonium chloride, triphenylmethylammonium chloride, triethylcyclohexylammonium chloride, and their bromine and iodine analogues.

The siliceous materials include silicon dioxide, talc, calcium silicate, siliceous clays, and the like. In the practice of the invention, these materials are used in finely divided form, preferably 50 mesh (American Standard) or finer.

The amount of quaternary ammonium compound used will be from 0.05 to 20 parts, preferably from 0.1 to 10 parts per hundred parts of polymer. The amount of siliceous material will be from 1 to 50, preferably from 10 to 30 parts per hundred parts polymer. Larger amounts of either can be used if desired.

The solid polymer or resin is ordinarily dispersed in water at a ratio of about 1 kilogram of polymer to about 5 to 15 gallons of water. The particle size of the polymer will ordinarily be from about 10 to about 100 mesh (American Standard).

It is an advantage of the invention that the siliceous material is not occluded in the polymer to any appreciable extent, thus providing products which are essentially clear.

In the practice of the invention, the system is subjected to continuous agitation to prevent settling of the particulate solid polymer. In some instances, addition of a small amount of a suitable wetting agent will aid in maintaining adequate dispersion. Suitable wetting agents include organic sulfates, sulfonates, polyphosphates, aralkyl polyethers, and the like. When used, the amount of wetting agent will be from about 0.5 to about 5.0 parts per hundred parts polymer.

Prewetting the polymer with a chlorinated hydrocarbon such as carbon tetrachloride represents a preferred procedure, when used in a chlorination process using a polyolefin such a polyethylene.

While the present invention has been described in terms of the use of a quaternary ammonium halide, it should be understood that in operations such as, for example, the chlorination of a polyolefin such as polyethylene wherein a reaction product is hydrogen chloride, quaternary ammonium hydroxides can be used. When so operating, the hydroxide is converted to the chloride and is active in the process as such.

The following examples will be helpful in an understanding of the invention but these examples are illustrative of the invention and should not be construed as unduly limiting the invention.

Example I

A series of runs was made for the chlorination of polyethylene in aqueous slurry. In these runs polyethylene fluff (Marlex® 6050), ground in a Wiley mill to pass a 0.03 inch screen, was wetted with an equal weight of carbon tetrachloride and charged to a reactor along with a measured volume of water. To this system was charged a weighed amount of the dispersant to be tested. The reactor was sealed and a measured amount of chlorine added. The temperature was elevated to operating range and maintained at this level until the chlorine appeared to have been consumed by the reaction, the system being illuminated with a 100-watt ultraviolet light. The system was then cooled, the pressure vented, and the reaction mixture poured through a ceramic filter where the polymer was washed with water and methanol. After washing, the product was dried under vacuum and the particles observed for size. Data on these runs are shown in Table I.

TABLE I

| Run No. | Polymer (gm.) | CCl₄ (gm.) | Silica [1] | | | CPC [2] | | | Water (gal.) | Chlorine (gm.) | Temp. (F.) | Time (hr.) | Particle Size | Chlorine Content Product (Approx.) |
|---|---|---|---|---|---|---|---|---|---|---|---|---|---|---|
| | | | Gm. | Phr. | Gm./gm. H₂O | Gm. | Phr.[5] | Gm./gm. H₂O | | | | | | |
| 1 [3] | 907 | 907 | 300 | 33 | 0.0079 | | | | 10 | 1,814 | 210 | 1.75 | Agglomerated | 47 |
| 2 [4] | 453 | 453 | | | | 50 | 11 | 0.0026 | 5 | 453 | 260 | 1.80 | 2-5 mm | 24 |
| 3 | 453 | 453 | | | | 20 | 4.5 | 0.0011 | 5 | 453 | 260 | 1.4 | 2-15 mm | 24 |
| 4 | 453 | 453 | 100 | 22 | 0.0053 | 10 | 2.2 | 0.00527 | 5 | 453 | 260 | 1.9 | <1 mm | 24 |

[1] Air blown silica, 0.015 to 0.020 micron particle size.
[2] Cetylpyridinium chloride.
[3] To this run was added 5 gm. Duponol (Lauryl Sulfate).
[4] To this run was added 3 gm. Duponol (Lauryl Sulfate).
[5] Parts per hundred parts resin (polymer).

It will be noted in Table I that in run No. 1, wherein only silica was used as the dispersant, the polymer particles agglomerated. It should also be noted in Table I that neither silica nor the quaternary ammonium halide was completely effective but that the combination of the two, as illustrated in run No. 4, was eminently satisfactory to prevent agglomeration.

Example II

A run was made according to the procedure of Example I. In this run 500 grams of powdered polyethylene (same as in Example I) was wetted with 500 grams of carbon tetrachloride and slurried in five gallons of water to which had been added 5 grams of cetyldimethylethylammonium bromide (1.0 phr.) and 50 grams (10 gm. phr.) air blown silica (Cab-O-Sil M-5). The reactor was sealed and 500 grams elemental chlorine added. The system was heated at 260° F. for 0.75 hour with 2 gms. lauryl peroxide added. The product, recovered as shown in Example I, was in particles less than 1 mm. in diameter.

Reasonable variations and modifications are possible within the scope of this disclosure without departing from the spirit and scope of the invention.

That which is claimed is:

1. A method for maintaining a slurry consisting essentially of a finely divided, solid 1-olefin polymer in an inert liquid consisting essentially of adding to said slurry about 0.1 to 10 parts per 100 parts of polymer by weight of a quaternary ammonium halide and about 10 to 30 parts per 100 parts of polymer by weight of silica having a particle size of 50 screen mesh or smaller in amounts sufficient to prevent agglomeration of polymer particles at a temperature above the softening point of the particles.

2. A method for maintaining a disperse aqueous slurry of a finely divided, solid linear polymer of ethylene consisting essentially of adding to said slurry from about 0.05 to about 20 parts by weight per 100 parts by weight of polymer of a quaternary ammonium halide wherein the quaternary ammonium radical has a formula weight of about 200 to about 400; and about 1 to about 50 parts by weight per 100 parts by weight of polymer of silica having a particle size of 50 screen mesh or smaller to prevent agglomeration of the polymer particles at a temperature above the softening point of the particles.

3. The method of claim 2 wherein about one kilogram of polymer is dispersed in about 5 to 15 gallons of water.

4. The method of claim 2 wherein the particle size of the polymer is from about 10 to about 100 screen mesh.

5. The method of claim 2 wherein the polymer is halogenated while slurried in the water.

6. The method of claim 2 wherein the temperature is in the range of about 220 to about 300° F. and the pressure is sufficient to maintain the water in liquid phase.

7. The method of maintaining a finely divided polyethylene dispersed in water at elevated temperatures and pressures during the step of chlorinating said polymer, said method consisting essentially of adding to said dispersion a quaternary ammonium halide and silica having a particle size of 50 screen mesh or smaller in amounts sufficient to prevent agglomeration of said polyethylene.

8. The method of preparing and maintaining a stable slurry consisting essentially of dispersing a finely divided, solid 1-olefin polymer having a screen mesh particle size of about 10 to 100 in water with agitation to form a slurry; adding to said slurry about 1 to 2.2 parts per 100 parts of polymer by weight of a quaternary ammonium halide wherein the quaternary ammonium radical has a formula weight of about 200 to 400, and about 10 to 22 parts per 100 parts of polymer by weight of silica having a particle size of not more than about 50 screen mesh; and heating the slurry to a temperature in the range of about 220 to 300° F. at a pressure sufficient to maintain a liquid water phase.

9. The method of claim 8 wherein the polymer is halogenated while slurried in the water.

10. The method of claim 8 wherein the quaternary ammonium halide is cetylpyridinium chloride.

11. The method of claim 8 wherein the quaternary ammonium halide is cetyldimethylethylammonium bromide.

12. A stable dispersion of a finely divided, solid olefin polymer in an inert liquid wherein said dispersion contains a quaternary ammonium halide and silica having a particle size of 50 screen mesh or smaller in amounts sufficient to prevent agglomeration of said polymer.

13. The method of maintaining finely divided solid polyethylene having a screen mesh particle size of about 10 to 100 wherein the polyethylene is wetted with carbon tetrachloride, dispersed with agitation in water at a ratio of about 1 kilogram of polyethylene per 5 to 15 gallons of water, a chlorinating amount of chlorine is added to said dispersion while maintaining the dispersion at a chlorinating temperature of about 220 to about 400° F. and a pressure above the vapor pressure of the water for a time sufficient to chlorinate said polyethylene, said method consisting essentially of adding to said agitated dispersion prior to said chlorination step about 0.05 to about 20 parts by weight of a quaternary ammonium halide, wherein the quaternary ammonium radical has a formula weight of bout 200 to about 400, per 100 parts by weight of polyethylene and about 1 to about 50 parts by weight of silica, having a screen mesh particle size of about 50 or less, per 100 parts by weight of polyethylene.

References Cited by the Examiner

UNITED STATES PATENTS

| | | | |
|---|---|---|---|
| 2,138,226 | 11/1938 | Dales et al. | 260—29.7 |
| 2,403,966 | 7/1946 | Brown et al. | 260—29.7 |
| 2,422,919 | 6/1947 | Myles et al. | 260—94.9 |
| 2,503,252 | 4/1950 | Erns Berger | 260—94.9 |
| 2,592,763 | 4/1952 | Taylor | 260—94.9 |
| 2,809,950 | 10/1957 | Bowers | 260—29.6 |
| 2,859,190 | 11/1958 | Cubberly | 260—29.604 |
| 2,965,596 | 12/1960 | Sharf | 260—29.6 |
| 3,035,038 | 5/1962 | Nolte et al. | 260—94.9 |

WILLIAM H. SHORT, *Primary Examiner.*

DANIEL ARNOLD, *Examiner.*

J. NORRIS, H. L. SATZ, *Assistant Examiners.*